(12) United States Patent
Yebka et al.

(10) Patent No.: US 10,886,508 B2
(45) Date of Patent: Jan. 5, 2021

(54) ADHESIVE BATTERY SECUREMENT

(71) Applicant: Lenovo (Singapore) Pte. Ltd., Singapore (SG)

(72) Inventors: Bouziane Yebka, Apex, NC (US); Tin-Lup Wong, Chapel Hill, NC (US); Philip John Jakes, Durham, NC (US); Jeremy Robert Carlson, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 123 days.

(21) Appl. No.: 16/290,065

(22) Filed: Mar. 1, 2019

(65) Prior Publication Data
US 2020/0280032 A1    Sep. 3, 2020

(51) Int. Cl.
*H01M 2/10*    (2006.01)
*H01M 2/16*    (2006.01)
*C09J 7/38*    (2018.01)

(52) U.S. Cl.
CPC ........... *H01M 2/1022* (2013.01); *C09J 7/38* (2018.01); *H01M 2/168* (2013.01); *C09J 2203/326* (2013.01); *C09J 2203/33* (2013.01); *C09J 2467/006* (2013.01); *H01M 2200/20* (2013.01)

(58) Field of Classification Search
CPC .... C09J 7/38; C09J 2301/18; C09J 2203/326; C09J 2203/33; C09J 2301/122; C09J 2301/302; C09J 2201/606; C09J 2201/20; C09J 2201/122; H01M 2/1022; H01M 2/168; H01M 2200/20
See application file for complete search history.

(56) References Cited

U.S. PATENT DOCUMENTS 5,637,176 A *  6/1997  Gilleo ................... B29C 41/12
                                                             156/277

* cited by examiner

*Primary Examiner* — Barbara L Gilliam
*Assistant Examiner* — George Kim
(74) *Attorney, Agent, or Firm* — Ference & Associates LLC

(57) ABSTRACT

One embodiment provides a device, including: a battery; and a tape strip comprising: a top surface; a bottom surface; and at least one elevatable section, wherein the at least one elevatable section comprises an area, situated in the top surface, containing an adhesive; wherein the top surface is composed of a non-adhesive substance on all portions of the top surface not associated with the area and wherein the bottom surface is composed of the adhesive on all portions of the bottom surface not associated with the at least one elevatable section; wherein the battery is adhered to the top surface of the tape strip via an adhesive connection between the area containing the adhesive and a bottom surface of the battery, wherein the tape strip is adhered to the device via another adhesive connection between the bottom surface of the tape strip and an inner portion of the device.

20 Claims, 10 Drawing Sheets

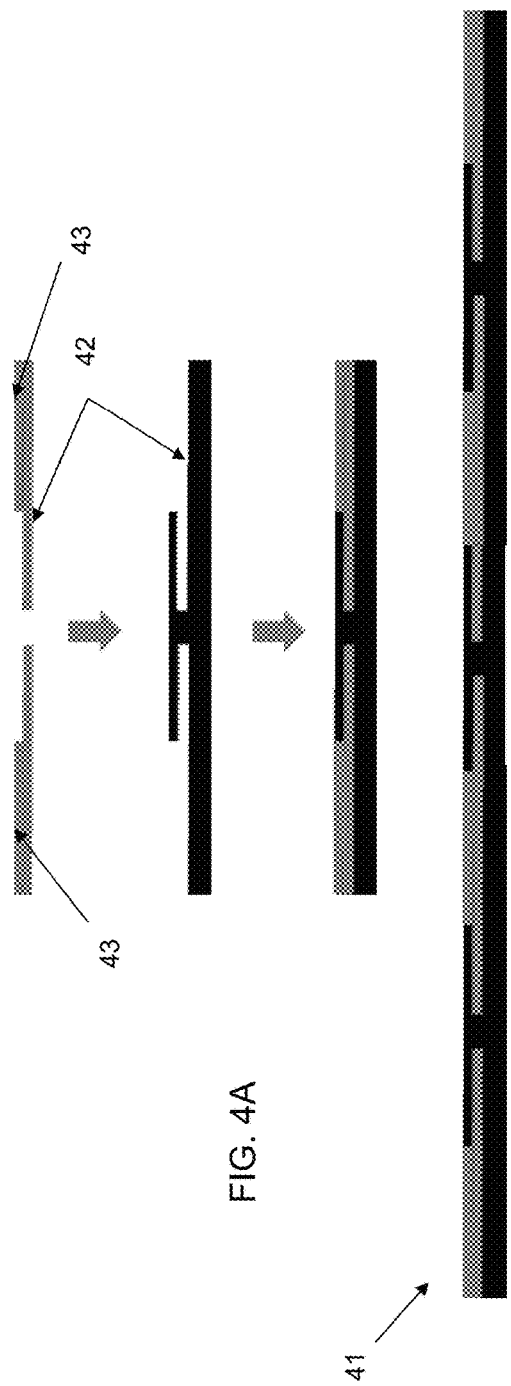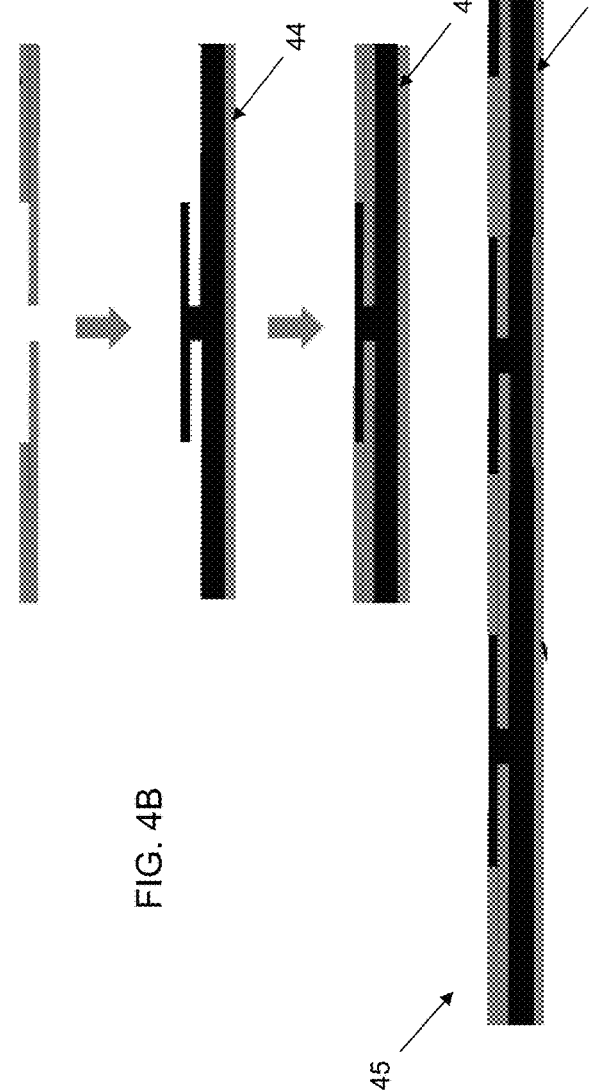
FIG. 4A
FIG. 4B

ADHESIVE BATTERY SECUREMENT

BACKGROUND

Many information handling devices ("devices"), for example smart phones, tablets, laptops and personal computers, other electronic devices, and the like, comprise one or more battery packs that are capable of powering the device for a limited period of time while the device is disconnected from a power source. Generally, the battery packs are rechargeable, ensuring that a user does not have to exchange the battery packs often. However, after a prolonged period of use, the battery packs lose their effectiveness and must be removed and/or replaced.

BRIEF SUMMARY

In summary, one aspect provides an information handling device, comprising: a battery; and a tape strip comprising: a top surface; a bottom surface; and at least one elevatable section, wherein the at least one elevatable section comprises an area, situated in the top surface, containing an adhesive; wherein the top surface is composed of a non-adhesive substance on all portions of the top surface not associated with the area and wherein the bottom surface is composed of the adhesive on all portions of the bottom surface not associated with the at least one elevatable section; wherein the battery is adhered to the top surface of the tape strip via an adhesive connection between the area containing the adhesive and a bottom surface of the battery and wherein the tape strip is adhered to the information handling device via another adhesive connection between the bottom surface of the tape strip and an inner portion of the information handling device.

Another aspect provides a tape strip, comprising: a top surface; a bottom surface; and at least one elevatable section, wherein the at least one elevatable section comprises an area, situated in the top surface, containing an adhesive; wherein the top surface is composed of a non-adhesive substance on all portions of the top surface not associated with the area and wherein the bottom surface is composed of the adhesive on all portions of the bottom surface not associated with the at least one elevatable section.

A further aspect provides a method of removing a battery pack from an information handling device, comprising: applying a force to an edge of the battery pack, the battery pack being secured to the information handling device by a tape strip, wherein the tape strip comprises: a top surface; a bottom surface; and at least one elevatable section, wherein the at least one elevatable section comprises an area, situated in the top surface, containing an adhesive; wherein the top surface is composed of a non-adhesive substance on all portions of the top surface not associated with the area and wherein the bottom surface is composed of the adhesive on all portions of the bottom surface not associated with the at least one elevatable section; wherein the battery is adhered to the top surface of the tape strip via an adhesive connection between the area containing the adhesive and a bottom surface of the battery and wherein the tape strip is adhered to the information handling device via another adhesive connection between the bottom surface of the tape strip and an inner portion of the information handling device; raising, with the applied force, the battery up from the tape strip, wherein the raising correspondingly raises the at least one elevatable section; and breaking, via the applied force, the adhesive connection between the area containing the adhesive and the bottom surface of the battery.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 4(A-B) illustrate composite tape adherence solutions according to an embodiment.

DETAILED DESCRIPTION

Figure 1:
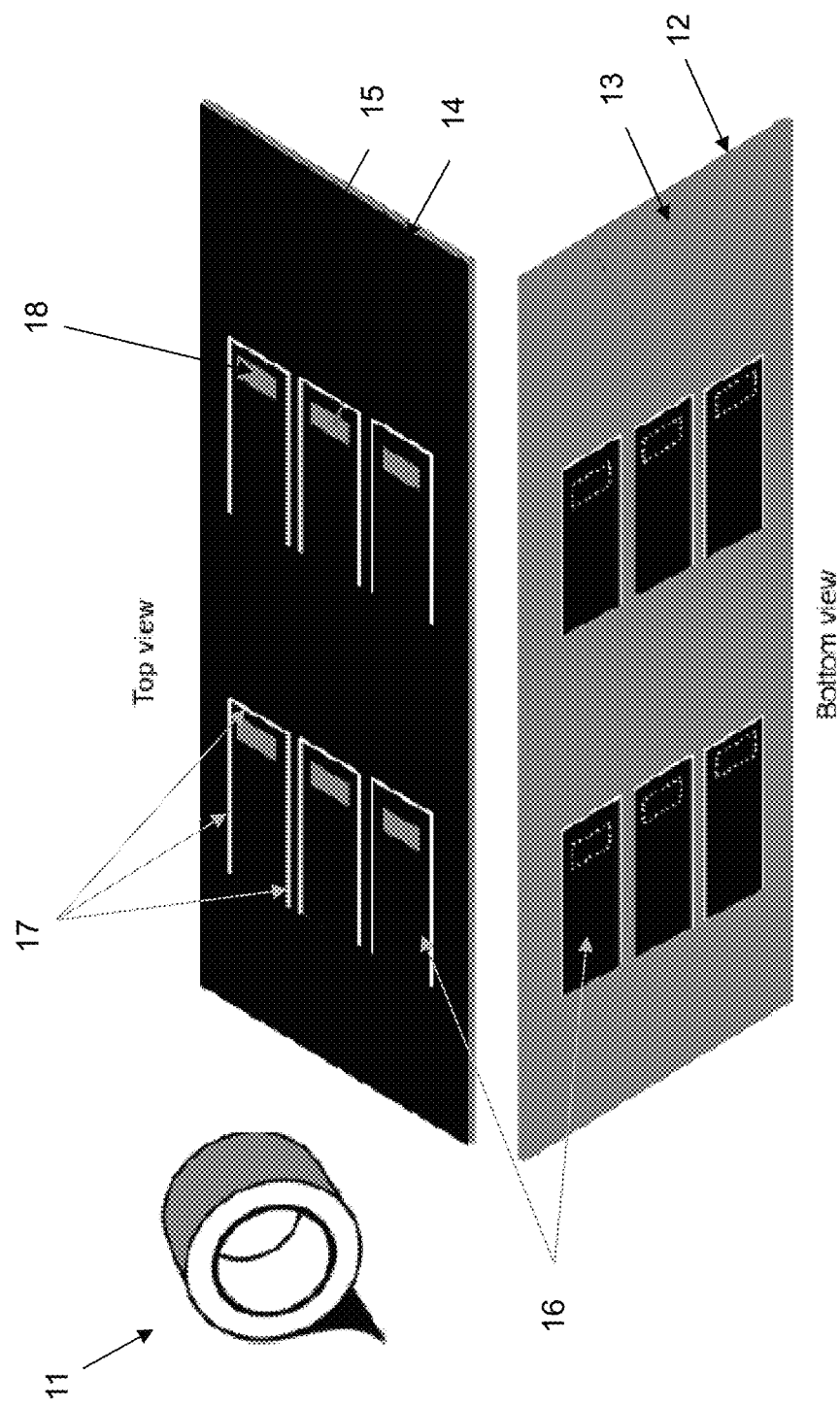
FIG. 1 illustrates a tape strip adherence solution according to an embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Issues often arise when rechargeable battery packs secured in devices must be removed and/or replaced. One reason for this difficulty is that the battery packs are often tightly situated in places among other device components, making it difficult for a user to reach in with their fingers and remove the battery pack. As a result, many users resort to unconventional methods of battery pack removal. For example, a user may attempt to remove the battery pack by forcefully hitting the device against an object in hopes of loosening the battery pack from its secured position in the device. As another example, a user may attempt to use another object (e.g., a coin, a card, etc.) as a wedge by inserting the other object in between the battery pack and the device. In both of the foregoing examples, and others not explicitly described here, the unconventional removal methods may cause damage to the battery pack, to other components of the device, and, in certain extreme cases, to the users themselves.

Accordingly, solutions have been developed that make removal of the battery pack easier and safer. For example, an adhesive strip may be placed on the underside of the battery pack, a portion of which may extend out from beyond the edges of the battery pack. In this configuration, a user may be able to remove the battery pack by simply grabbing the exposed portion of the adhesive strip and pulling upwards and/or outwards. Such a solution provides a user with the appropriate access and leverage to remove the battery pack without enacting too much force on the device and/or the other device components.

An issue with the conventional solution described above is that battery pack service intervals generally exceed the lifetime of the adhesive strip. More particularly, when the time comes to remove the battery pack the adhesive strip may have dried out and became very brittle. Accordingly, when a user attempts to pull on the exposed portion of the strip, the exposed portion may snap or break off. In this situation, the user is faced with the original access and leverage issue and must resort to the unconventional removal methods described above.

Accordingly, embodiments of the underlying application provide easy service adherence solutions for battery pack removal. A variety of different battery removal methods are described below, each solution utilizing a different adhesive-based removal method. The illustrated example embodiments will be best understood by reference to the figures. The following description is intended only by way of example, and simply illustrates certain example embodiments.

Referring now to FIG. 1, an embodiment provides a tape strip ("tape strip") 11. In an embodiment, one surface (e.g., a bottom surface) 12 of the tape strip 11 may be substantially covered by an adhesive 13 and the other surface (e.g., a top surface) 14 may be substantially covered by a polymeric film 15. In an embodiment, the adhesive 13 may be virtually any type of pressure-sensitive adhesive (i.e., a type of non-reactive adhesive that forms a bond when pressure is applied to bond the adhesive with the adherend). In an embodiment, the polymeric film 15 may be a type of synthetic polymer resin such as polyester film.

In an embodiment, the tape strip 11 may comprise one or more elevatable sections 16. In the context of this application, an elevatable section 16 may refer to a section that may be originally flush with the surrounding tape strip 11 but may rise upwards, in a y-direction, responsive to experiencing a reacting force (later described herein). In an embodiment, the one or more elevatable sections 16 may have a particular shape. For example, each of the elevatable sections illustrated in FIG. 1 comprise a rectangular shape. However, such a designation is not limiting and other shapes may also be utilized. Additionally, in the case of a plurality of elevatable sections 16, all of the elevatable sections 16 may adopt the same shape or, alternatively, some sections may adopt one shape whereas other sections may adopt another shape. Additionally still, in the case of a plurality of elevatable sections 16, all of the elevatable sections 16 may be the same size or, alternatively, some sections may be one size and other sections may be a different size. The positioning, dimensions (i.e., size, shape, etc.), and number of elevatable sections 16 may vary depending on the battery and/or device type (e.g., size of the battery, etc.). For simplicity purposes and with regards to FIG. 1 and FIG. 2, six rectangular shaped elevatable sections are illustrated, each having substantially the same dimensions.

In an embodiment, each of the elevatable sections 16 may have two or more perforated edges 17. In the context of this application, a perforated edge may be an edge that is either partially connected with the surrounding tape strip 11 or, alternatively, an edge that is not connected at all with the surrounding tape strip 11. These perforations may allow the elevatable section to easily rise up from the surrounding material and may be introduced during the manufacturing process. With reference to FIG. 1, the elevatable sections 16 here comprise three perforated edges 17. Furthermore, in an embodiment, each of the one or more elevatable sections 16 may comprise an area 18 containing the adhesive 13. This adhesive area 18 may be the mechanism by which the top surface 14 of the tape strip 11 secures a battery pack. In an embodiment, the adhesive area 18 may be located proximate to a perforated edge 17 that is opposite from an unperforated edge.

In an embodiment, the adhesive 13 may cover some, most, or substantially all portions of the bottom surface 12 of the tape strip 11 except for those portions being associated with the one or more elevatable sections 16. For example, the adhesive on the bottom surface 12 of the tape strip 11 illustrated in FIG. 1 covers substantially the entire bottom surface 12 except those portions being associated with the plurality of elevatable sections 16. Furthermore, in an embodiment, the adhesive 13 may be transparent or, alternatively, may be a visible color (e.g., green, blue, etc.). In an embodiment, the polymeric substance may cover substantially all portions of the top surface 14 except the adhesive areas 18 on the one or more elevatable sections 16.

Figure 2:
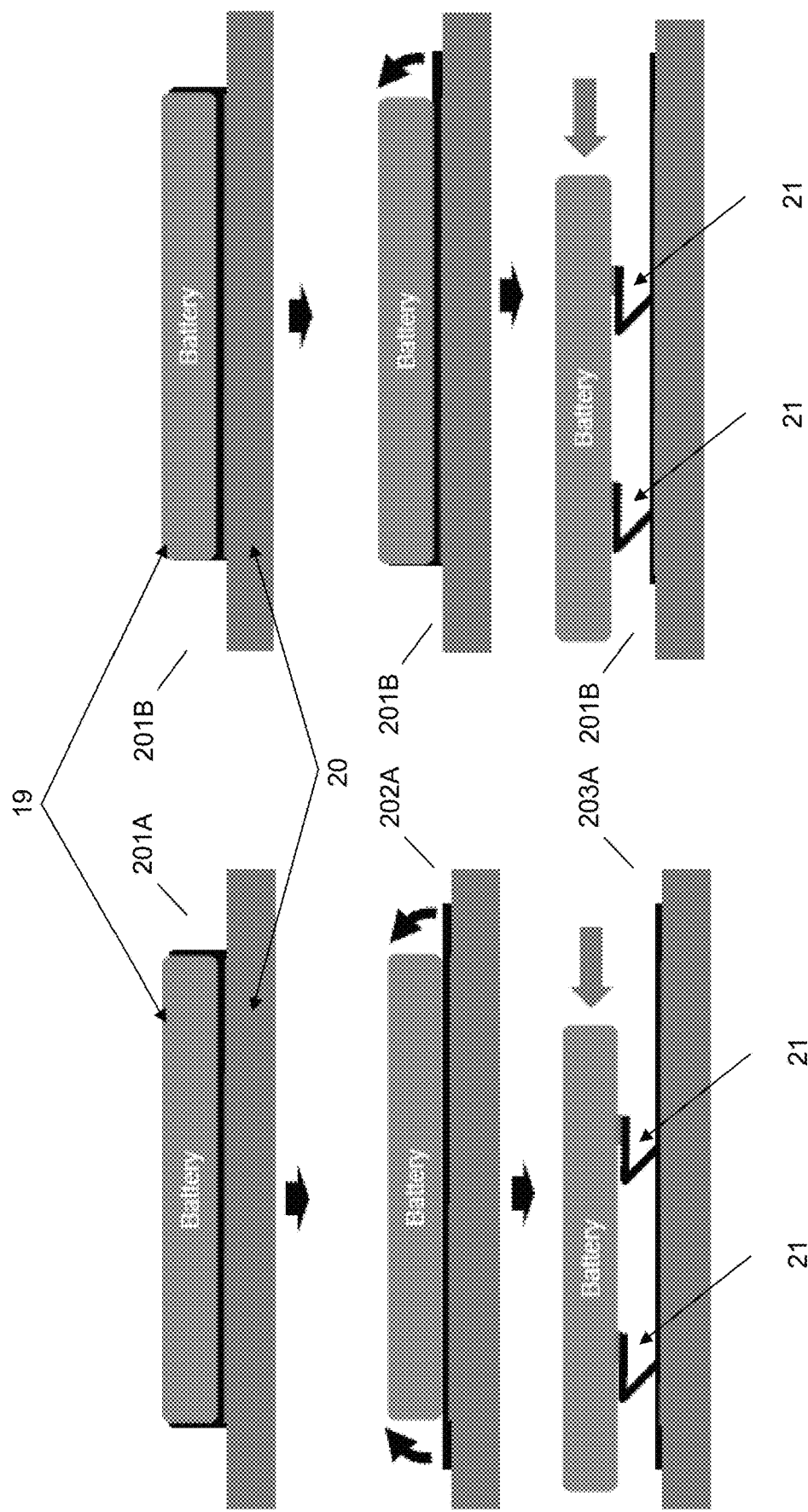
FIG. 2(A-B) illustrates a battery removal method according to an embodiment.

Referring now to FIG. 2(A-B), non-limiting examples of removing a battery pack secured to a device using the tape strip illustrated in FIG. 1. With reference to FIG. 2A, a battery pack 19 may be secured to a device 20 via the tape strip 11 at 201A. A bottom surface of the battery pack 19 may make an adhesive connection to the tape strip 11 via contact with the adhesive areas 18 of the elevated sections. The tape strip 11 may make an adhesive connection with an inner surface of the device 20 via the bottom surface 12 of the tape strip 11. At 202A, the battery pack 19 may be raised from the device 20 via an upwards force (e.g., a user's fingers grabbing the battery pack, etc.) applied to two opposite edges of the battery pack 19. At 203A, the upwards force may cause the one or more elevatable sections 16 to rise up in a z-shape 21, thereby elevating the battery from the other components of the device 20. A user may thereafter remove the battery pack 19 from the tape strip 11 by providing force acting against/toward the unperforated edge.

With reference to FIG. 2B, at 201B, the battery pack 19 may be secured to a device 20 as described in step 201A above. At 202B, the battery pack 19 may be raised from the device 20 via a lifting force may be applied to a single edge of the battery pack 19 (e.g., an edge opposite from the unperforated edge). At 203B, the lifting force applied to the single edge may raise the battery pack 19, which may thereafter be removed as described above in step 203A.

Figure 3:
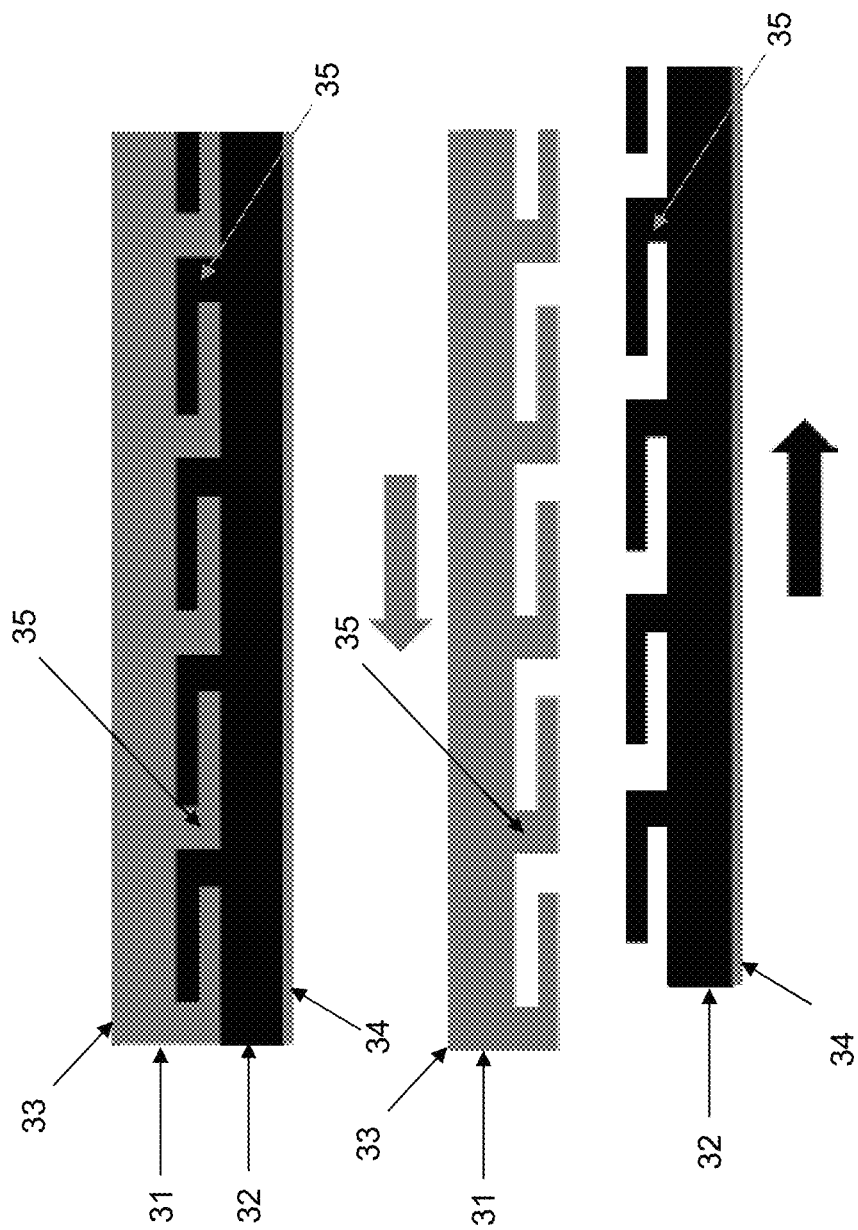
FIG. 3 illustrates a sliding clip type adherence solution according to an embodiment.

Referring now to FIG. 3, a clip-type adherence solution is illustrated. In such an embodiment, two tape strips 31, 32 may be utilized. Each of the tape strips 31, 32 may comprise a surface 33, 34 covered substantially completely by an adhesive (e.g., a pressure-sensitive adhesive, etc.). A battery pack adhering tape strip 31 may be adhered to a bottom surface of the battery pack (not illustrated) via an adhesive connection through the adhesive-covered surface 33. A device adhering tape strip 32 may be adhered to an inner surface of the device (not illustrated) via an adhesive connection through the adhesive-covered surface 34. In an embodiment, the other surface of each of the tape strips 31, 32, opposite from the adhesive-covered surface 33, 34, may comprise a polymer material having a plurality of hooked portions 35, 36. The plurality of hooked portions 35 on the battery pack adhering tape strip 31 may be connectable to the plurality of hooked portions 36 on the device adhering tape strip 32. This connection may securely connect the battery pack to the device. In order to remove the battery pack from the device, the battery pack and the device may be moved (e.g., by sliding, etc.) in opposing directions. The opposing force may cause the plurality of hooked portions 35 on the battery pack adhering tape strip 31 to come apart from the plurality of hooked portions 36 on the device adhering tape strip 32.

Referring now to FIG. 4A, a composite tape adherence solution is illustrated. Such an embodiment may comprise a tape strip 41 comprising a plurality of polymeric film sections 42. The upper surface of the tape strip may comprise a plurality of adhesive sections (e.g., pressure-sensitive adhesive sections, etc.) 43. The top edge of the adhesive sections may be substantially flush with a top edge of the upper most polymeric film section. In an embodiment, the adhesive sections 43 may be separated from each other by the upper most polymeric film sections and may be spaced substantially equally apart. In another embodiment, the spacing between adhesive sections 43 may be irregular. In an embodiment, the adhesive sections 43 may secure the battery pack (not illustrated) via an adhesive connection made between the adhesive section 43 and a bottom surface of the battery pack. The battery pack may be removed by simply exerting an upward force on the battery pack (e.g., by pulling the battery pack upwards, etc.). The upward force may sever the weak adhesive connection created by the spacing between adhesive sections 43 on the tape strip 41. The tape strip configuration in FIG. 4B may substantially resemble that of FIG. 4A, however, the bottom surface 44 of the tape strip 41 illustrated in FIG. 4B may be composed substantially of the adhesive material, which may be used to create an adhesive connection between the tape strip 45 and an inner portion of the device (not illustrated).

Figure 5:
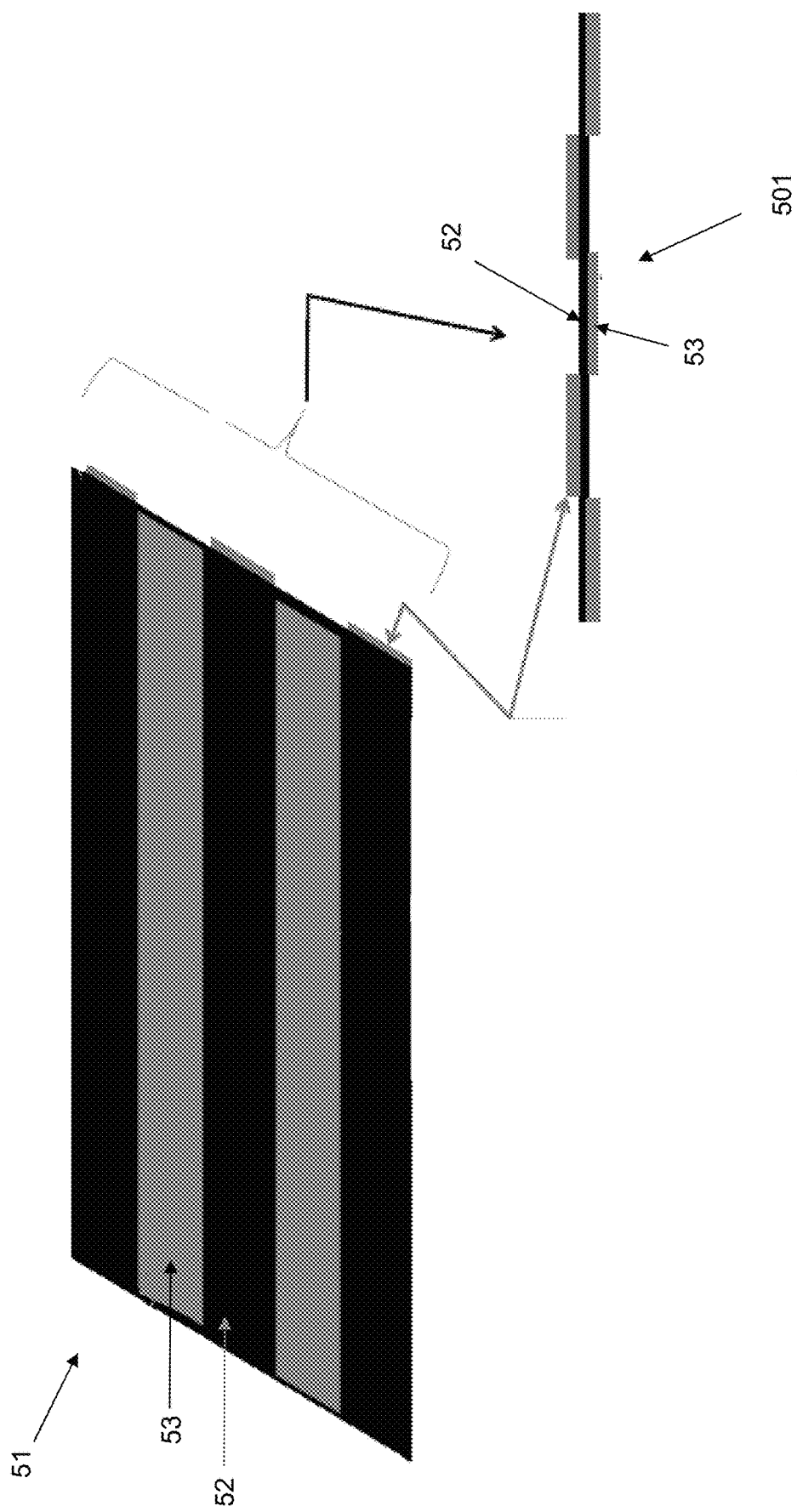
FIG. 5 illustrates an alternating line adherence solution according to an embodiment.

Referring now to FIG. 5, an alternating line adherence solution is illustrated. Such an embodiment may comprise a double-sided tape strip 51 having two opposing surfaces, wherein each of the surfaces are composed of alternating portions of polymer film 52 and adhesive (e.g., a pressure-sensitive adhesive, etc.) 53. In an embodiment, one surface (e.g., an upper surface) of the tape strip 51 may be adhered to a bottom surface of a battery pack (not illustrated) and the other surface (e.g., a bottom surface) of the tape strip 51 may be adhered to an inner portion of a device (not illustrated). In an embodiment, the material type of a portion on one surface may be different from the material type of the portion on the directly opposite surface. For example, if a portion on an upper surface of the tape strip is associated with an adhesive, the corresponding bottom surface portion may be associated with a polymer film, as illustrated at 501. In an embodiment, the alternating nature of this solution may produce secure, but vulnerable, adhesive connections between the battery pack and the device. Accordingly, a user may remove the battery pack from the device by applying an upwards force on the battery pack.

Figure 6:
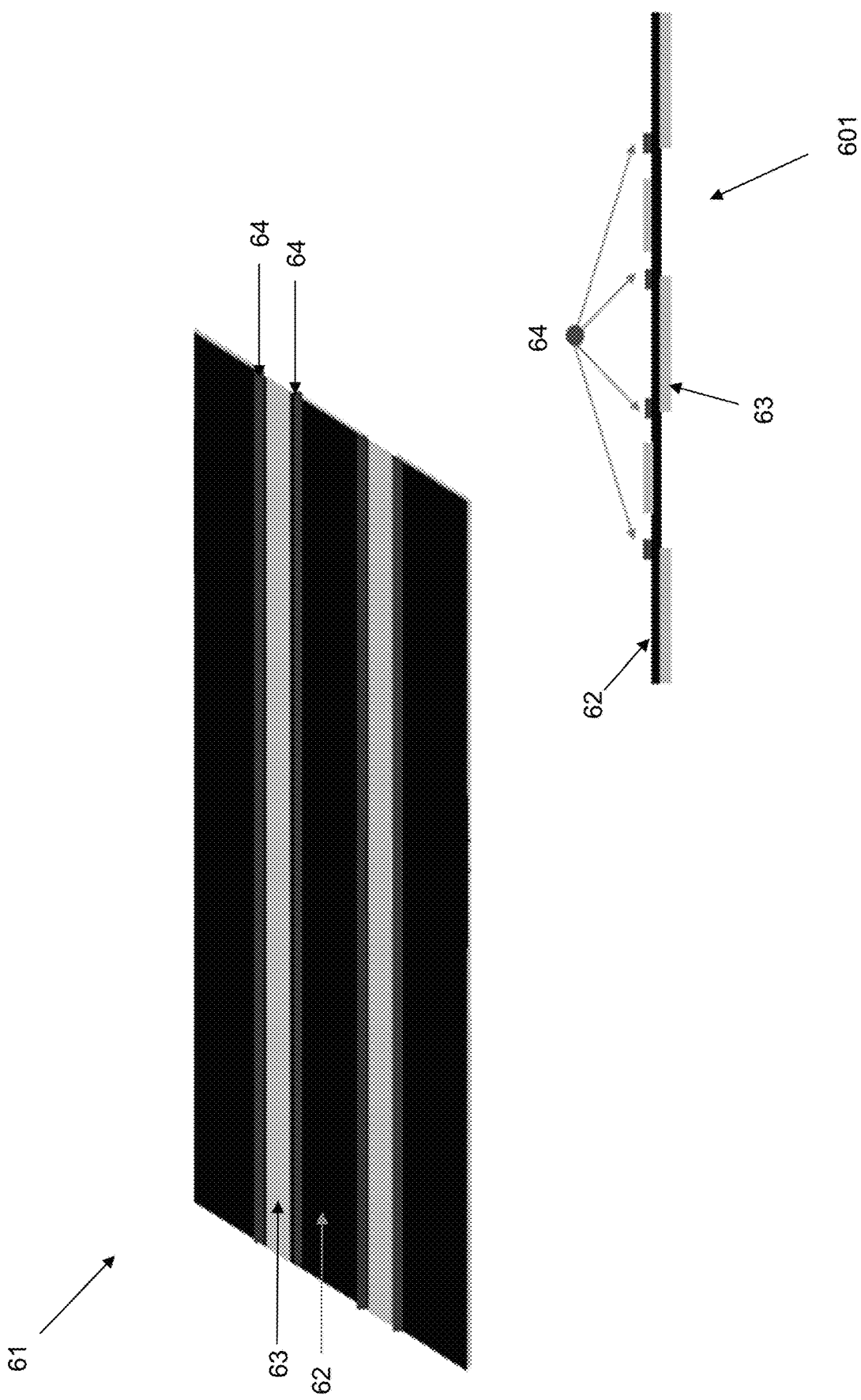
FIG. 6 illustrates an alternating line adherence solution comprising a pull string according to an embodiment.

Referring now to FIG. 6, an alternating line adherence solution comprising a pull string is illustrated. Such an embodiment may comprise a similar tape strip 61 configuration as described above in FIG. 5. However, instead of the alternating portions 62, 63 in FIG. 6 comprising substantially similar proportions, as was the case in FIG. 5, the alternating portions in FIG. 6 may be dissimilar in width. More specifically, a top view of the tape strip 61 shows that the polymer film portions 62 comprise a greater width than the adhesive portions 63 on an upper surface of the tape strip 61. Accordingly, a side view of the tape strip, at 601, shows that bottom surface adhesive portions 63 comprise a greater width than the bottom surface polymer film portions 62. Additionally, a tape strip 61 of the embodiments may also comprise one or more pull strings 64 that may border the adhesive portions 63 on the upper surface. The ends of the one or more pull strings 64 may be slightly exposed so that a user can grab hold of them. To remove a battery pack (not illustrated) secured to the tape strip 61, a user may manipulate the one or more pull strings 65 to sever the adhesive connection between the adhesive portions 63 on the upper surface of the tape strip and the battery pack.

Figure 7:
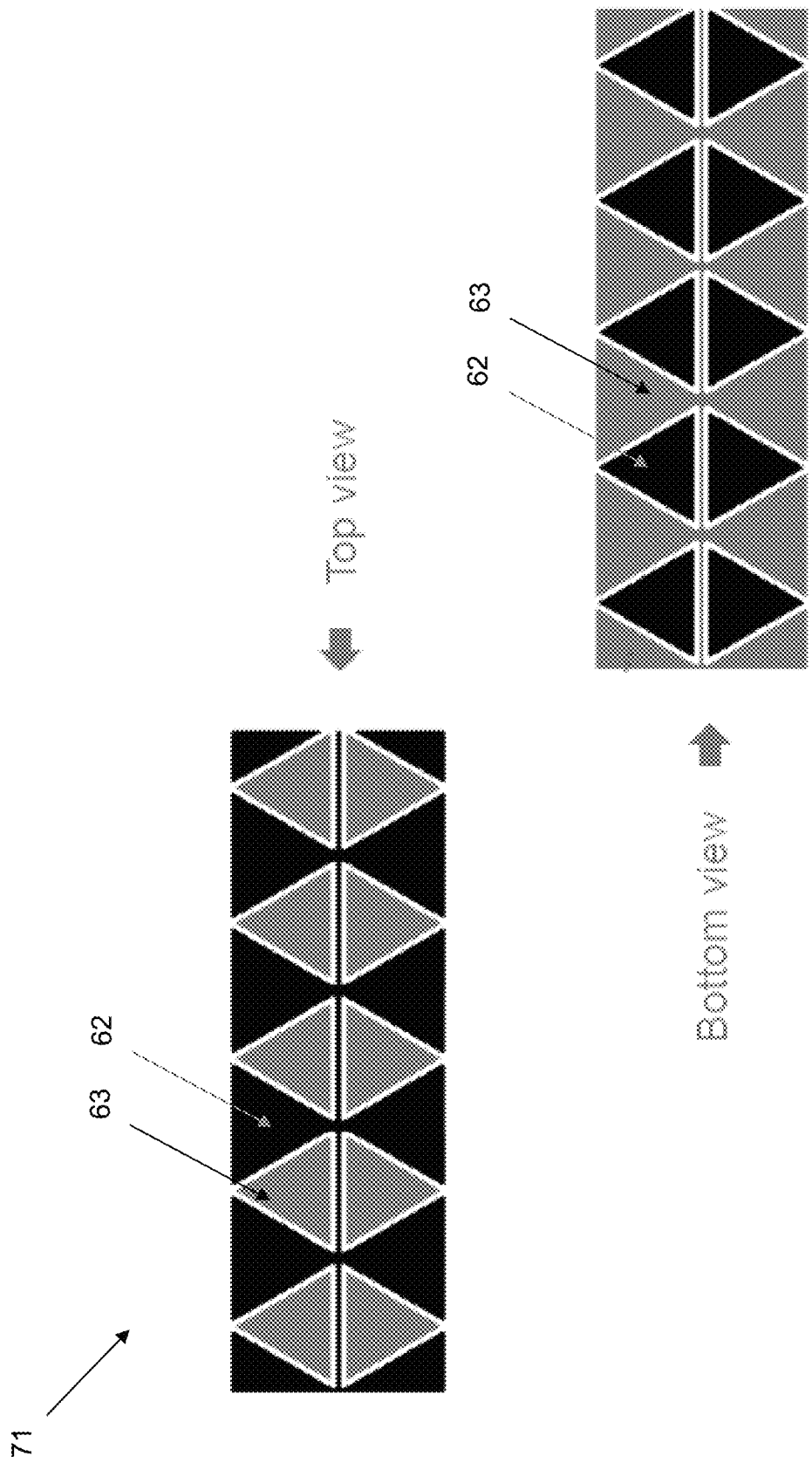
FIG. 7 illustrates an alternating irregular symmetric shape adherence solution according to an embodiment.

Referring now to FIG. 7, an alternating irregular symmetric shape adherence solution is illustrated. Such an embodiment may comprise a double-sided tape strip 71 having two opposing surfaces, wherein each of the surfaces are composed of alternating shaped areas of polymer film 72 and adhesive (e.g., a pressure-sensitive adhesive, etc.) 73. For example, FIG. 7 illustrates that each surface is composed of a plurality of triangular areas, wherein each area is composed of a different material than the area situated horizontally proximate to it. In an embodiment, one surface (e.g., a top surface) of the tape strip 71 may be adhered to a bottom surface of a battery pack (not illustrated) and the other surface (e.g., a bottom surface) of the tape strip 71 may be adhered to an inner portion of a device (not illustrated). In an embodiment, the material type of an area on one surface may be different from the material type of the area on the directly opposite surface. For example, if a triangular area on an upper surface of the tape strip is associated with an adhesive 73, the corresponding bottom surface triangular area may be associated with a polymer film 72. In an embodiment, the alternating nature of this solution may produce secure, but vulnerable, adhesive connections between the battery pack and the device. Accordingly, a user may remove the battery pack from the device by applying an upwards force on the battery pack.

Figure 8:
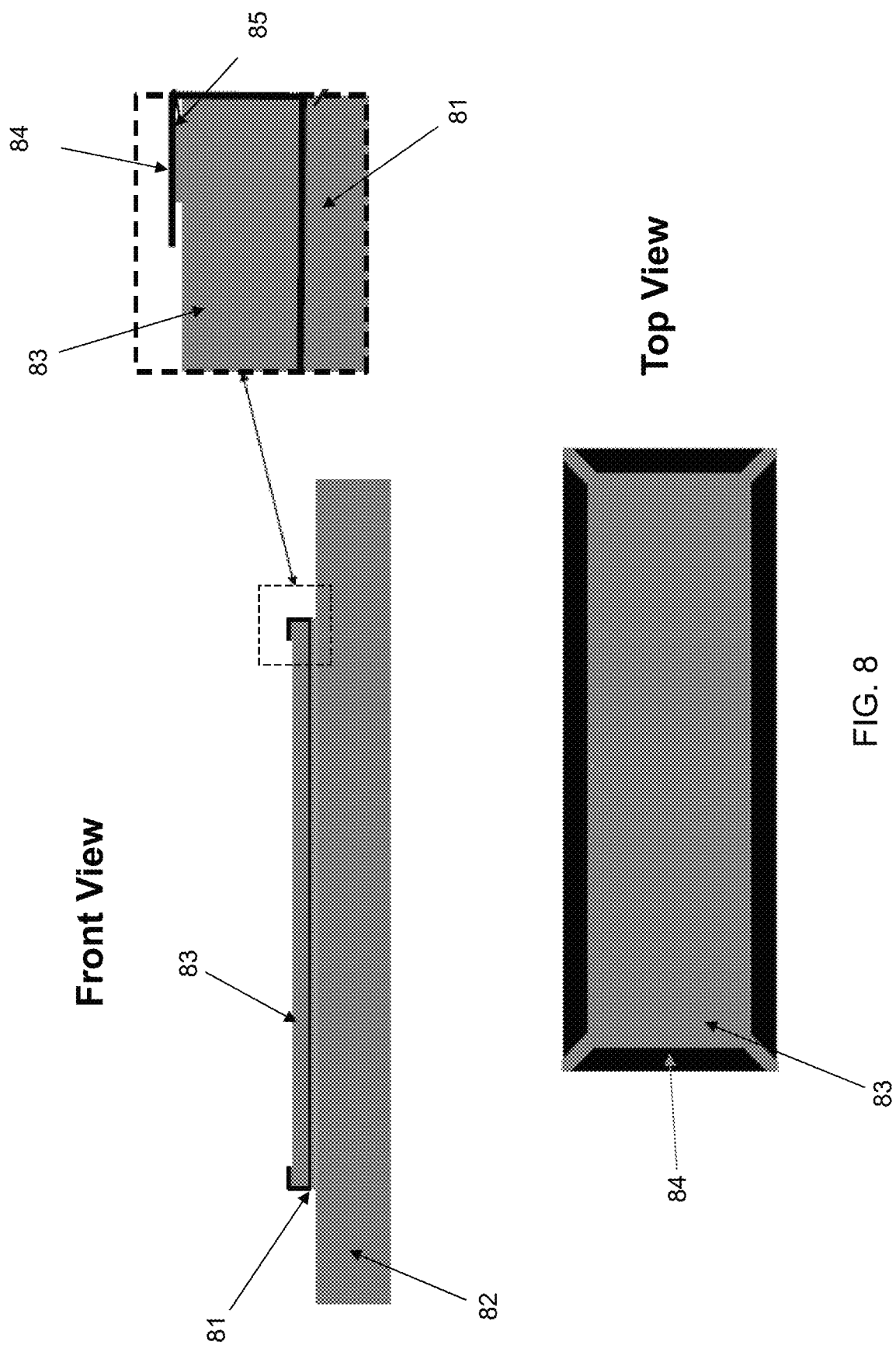
FIG. 8 illustrates an enclosed battery pack adherence solution according to an embodiment.

Referring now to FIG. 8, a solution is illustrated in which a battery pack is enclosed according to the following embodiments. In an embodiment, a tape strip 81 is illustrated that comprises an upper surface and a bottom surface. The bottom surface of the tape strip 81 may substantially consist of an adhesive material that may secure the tape strip 81 to an inner portion of a device 82. The upper surface of the tape strip 81 may substantially consist of a polymer material and may comprise a space for a battery pack 83. In an embodiment, the surface area of the upper surface may be greater than the surface area of a bottom and top portion of the battery pack 83. In an embodiment, once the battery pack is placed in the space in the upper surface, the battery pack 83 may be secured by wrapping the excess edges ("flaps") 84 of the upper surface around the edges and onto the top surface of the battery pack. In an embodiment, the extremities of the flaps may comprise an area having an adhesive 85. When folded over the top surface of the battery pack 83, the area having the adhesive 85 may establish an adhesive connection with the battery pack 83, thereby securing the battery pack 83 to the device 82. In an embodiment, to remove the battery pack a user may simply exert a small amount of upward force on the flaps 84 to break the weak adhesive connection to the battery pack 83.

Figure 9:
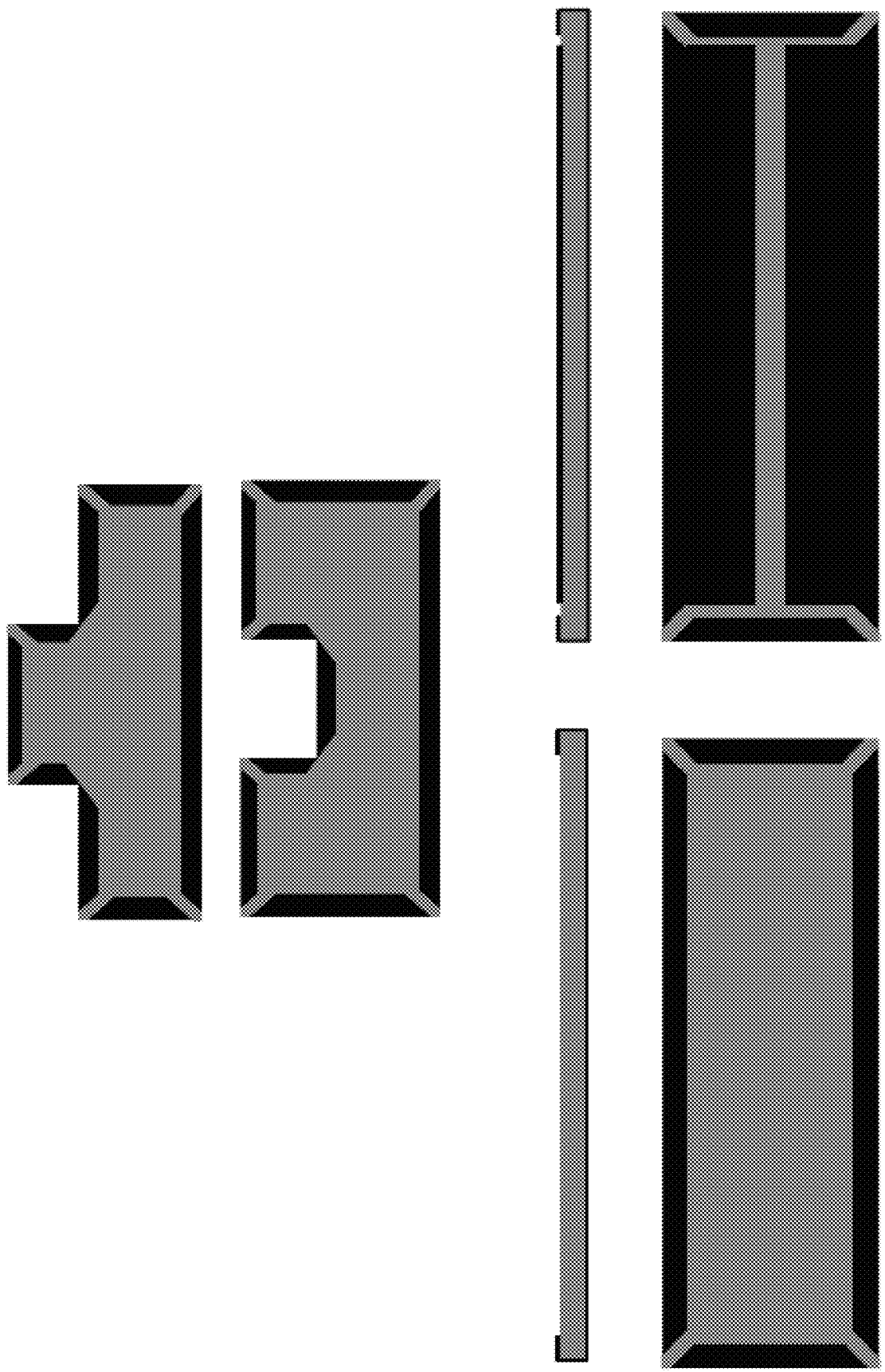
FIG. 9 illustrates other configurations of an enclosed battery pack adherence solution according to an embodiment.

In an embodiment, FIG. 9 illustrates a plurality of other battery pack securement configurations. In each of these configurations, the securement and removal process described above with respect to FIG. 8 may be applicable.

Figure 10:
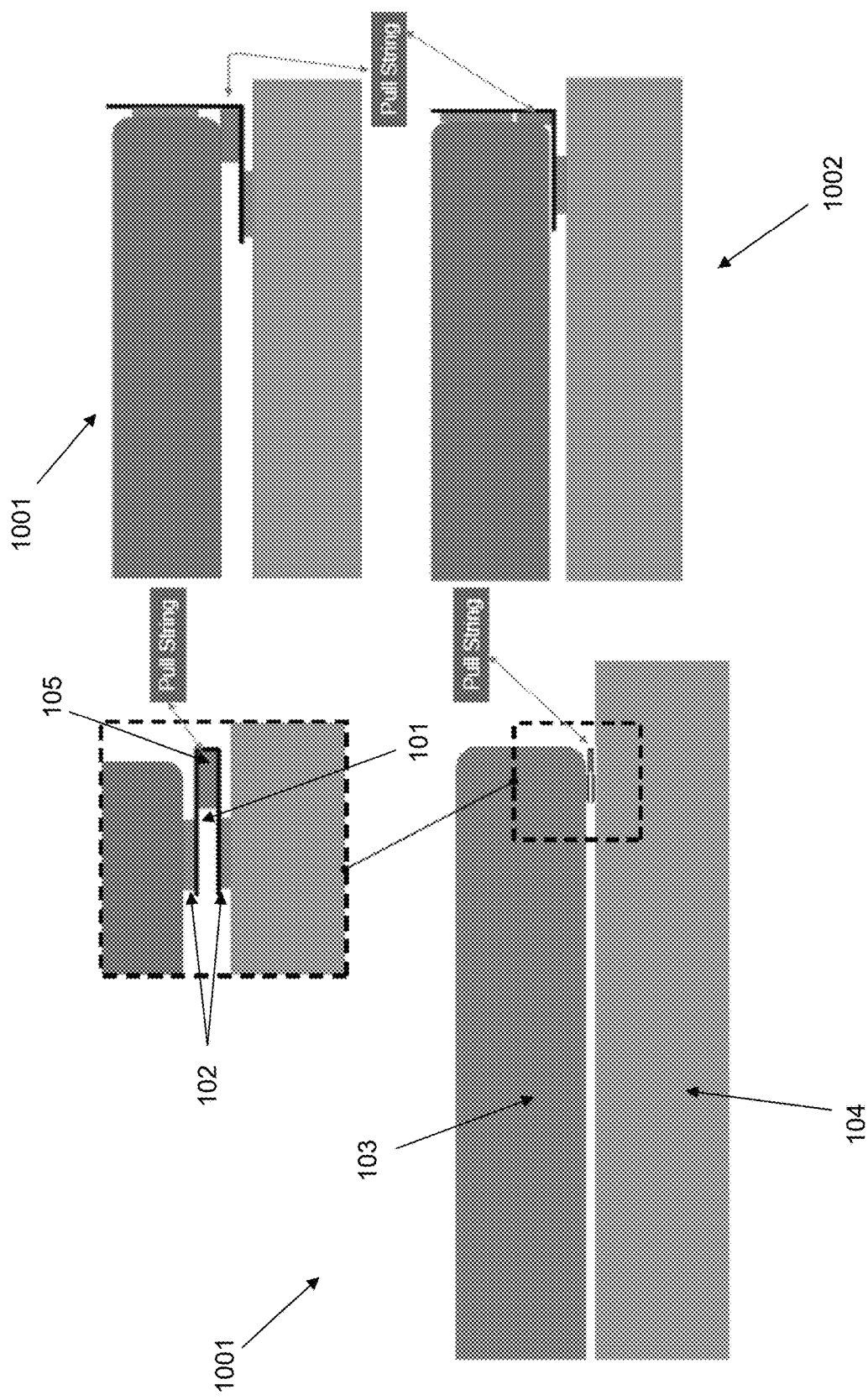
FIG. 10 illustrates configurations of a tape strip adherence solution comprising a pull string according to an embodiment.

Referring now to FIG. 10, a plurality of configurations of a pull-string integrated into a tape-strip securement solution are illustrated. The configuration at 1001 comprises a pull-string 101 sandwiched between two adhesive portions 102. One of the adhesive portions 102 may establish an adhesive connection with a battery pack 103 and the other adhesive portion 102 may establish an adhesive connection with a device 104. In an embodiment, a portion 105 of the pull string 101 may extend past a terminal edge of the battery pack 103. To remove the battery pack 103, a user may grab the extended portion 105 of the pull string 101 and pull the string to break the adhesive connections. The configurations at 1002 and 1003 also comprise a pull-string integrated into a tape strip mechanism that secures a battery pack to a device. In both of these configurations, the pull string may be pulled by the user to break the adhesive connections.

Although the foregoing embodiments have been described with respect to battery removal, such a designation is not limiting. More particularly, a person having skill in the art may recognize that the aforementioned adherence solutions and removal techniques may be applicable to other types of device components (e.g., System-on-a-Chip (SoC), memory and/or storage card, other hardware, etc.) other than simply battery packs.

The various embodiments described herein thus represent a technical improvement to conventional battery removal techniques. Using the techniques described herein, an embodiment may secure a battery pack to a device using a tape strip. In an embodiment, the tape strip may comprise one or more elevatable sections that may rise up from the underlying tape strip. In another embodiment, the tape strip may comprise alternating portions of adhesive material and polymer based material that may serve to produce accessible spaces for a user to attain the leverage they need to remove the battery. In yet another embodiment, the tape strip may comprise one or more pull strings that may be used to sever the adhesive connections that secure the battery to the device. In yet another embodiment, the tape strip may envelop portions of the battery pack with flaps. Such embodiments may make it easier and safer for a user to remove a battery pack for servicing, replacement, or recycling.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An information handling device, comprising:
 a battery; and
 a tape strip comprising:
  a top surface;
  a bottom surface; and
  at least one elevatable section, wherein the at least one elevatable section comprises an area, situated in the top surface, containing an adhesive;
 wherein the top surface is composed of a non-adhesive substance on all portions of the top surface not associated with the area and wherein the bottom surface is composed of the adhesive on all portions of the bottom surface not associated with the at least one elevatable section;
 wherein the battery is adhered to the top surface of the tape strip via an adhesive connection between the area containing the adhesive and a bottom surface of the battery and wherein the tape strip is adhered to the information handling device via another adhesive connection between the bottom surface of the tape strip and an inner portion of the information handling device.

2. The information handling device of claim 1, wherein the at least one elevatable section comprises a plurality of elevated sections.

3. The information handling device of claim 1, wherein the at least one elevatable section comprises at least one rectangular-shaped elevatable section.

4. The information handling device of claim 1, wherein the at least one elevatable section comprises a plurality of perforated edges and one unperforated edge.

5. The information handling device of claim 4, wherein the area containing the adhesive is positioned at a location on the at least one elevatable section at an opposite end from the unperforated edge.

6. The information handling device of claim 1, wherein the non-adhesive substance is a polymeric substance.

7. The information handling device of claim 6, wherein the polymeric substance is a polyester film.

8. The information handling device of claim 1, wherein the adhesive is a pressure-sensitive adhesive.

9. The information handling device of claim 1, wherein the at least one elevatable section comprises a plurality of elevatable sections and wherein each of the plurality of elevatable sections comprise substantially identical dimensions.

10. The information handling device of claim 1, wherein the at least one elevatable section is elevatable into a z-shape.

11. A tape strip, comprising:
 a top surface;
 a bottom surface; and
 at least one elevatable section, wherein the at least one elevatable section comprises an area, situated in the top surface, containing an adhesive;

wherein the top surface is composed of a non-adhesive substance on all portions of the top surface not associated with the area and wherein the bottom surface is composed of the adhesive on all portions of the bottom surface not associated with the at least one elevatable section.

12. The tape strip of claim 11, wherein the at least one elevatable section comprises a plurality of elevated sections.

13. The tape strip of claim 11, wherein the at least one elevatable section comprises at least one rectangular-shaped elevatable section.

14. The tape strip of claim 11, wherein the at least one elevatable section comprises a plurality of perforated edges and one unperforated edge.

15. The tape strip of claim 14, wherein the area containing the adhesive is positioned at a location on the at least one elevatable section at an opposite end from the unperforated edge.

16. The tape strip of claim 11, wherein the non-adhesive substance is a polymeric sub stance.

17. The tape strip of claim 11, wherein the polymeric substance is a polyester film.

18. The tape strip of claim 11, wherein the adhesive is a pressure-sensitive adhesive.

19. The tape strip of claim 11 wherein the at least one elevatable section is elevatable into a z-shape.

20. A method of removing a battery pack from an information handling device, comprising:

applying a force to an edge of the battery pack, the battery pack being secured to the information handling device by a tape strip, wherein the tape strip comprises:
   a top surface;
   a bottom surface; and
   at least one elevatable section, wherein the at least one elevatable section comprises an area, situated in the top surface, containing an adhesive;
   wherein the top surface is composed of a non-adhesive substance on all portions of the top surface not associated with the area and wherein the bottom surface is composed of the adhesive on all portions of the bottom surface not associated with the at least one elevatable section;
   wherein the battery is adhered to the top surface of the tape strip via an adhesive connection between the area containing the adhesive and a bottom surface of the battery and wherein the tape strip is adhered to the information handling device via another adhesive connection between the bottom surface of the tape strip and an inner portion of the information handling device;

raising, with the applied force, the battery up from the tape strip, wherein the raising correspondingly raises the at least one elevatable section; and breaking, via the applied force, the adhesive connection between the area containing the adhesive and the bottom surface of the battery.

* * * * *